(12) United States Patent
Shaw

(10) Patent No.: US 7,420,479 B2
(45) Date of Patent: Sep. 2, 2008

(54) UNIVERSAL KEYBOARD CONTROLLER DATA PROTOCOL

(75) Inventor: Ronald D. Shaw, Austin, TX (US)

(73) Assignee: Dell Prodcuts L.P., Round Rock, TX (US)

( * ) Notice: Subject to any disclaimer, the term of this patent is extended or adjusted under 35 U.S.C. 154(b) by 185 days.

(21) Appl. No.: 11/273,180

(22) Filed: Nov. 14, 2005

(65) Prior Publication Data
US 2007/0109151 A1    May 17, 2007

(51) Int. Cl.
H03M 11/00    (2006.01)

(52) U.S. Cl. .............................. 341/26; 341/20; 341/22; 345/168

(58) Field of Classification Search ................... 341/20, 341/22, 26; 345/168
See application file for complete search history.

(56) References Cited

U.S. PATENT DOCUMENTS

| | | | |
|---|---|---|---|
| 4,502,038 A | 2/1985 | Lowenthal et al. | 340/365 |
| 4,739,310 A | 4/1988 | Yamamoto | 340/365 |
| 6,040,788 A * | 3/2000 | Chambers et al. | 341/26 |

OTHER PUBLICATIONS

Wikipedia entry for Embeddd system, Oct. 2005 revision.*
Microsoft Corporation "USB HID to PS/2 Scan Code Translation Table" Apr. 2, 2004 (5 pages).
http://www.microsoft.com/whdc/device/input/Scancode.mspx?pf=true; Microsoft Windows Key Support, Keyboard Scan Codes, and Windows, Nov. 2, 2005 (2 pages).
Microsoft Corporation "Windows Platform Design Notes—Keyboard Scan Code Specification" Revision 1.3a, Mar. 16, 2000.
Messmer, Hans-Peter; The Indispensable PC Hardware Book—Fourth Edition "Chapter 34 The keyboard, mouse, and joystick" Great Britain 2002.

* cited by examiner

*Primary Examiner*—Albert K Wong
(74) *Attorney, Agent, or Firm*—Hamilton & Terrile, LLP; Stephen A. Terrile

(57) ABSTRACT

A keyboard system which includes a keyboard assembly and an embedded controller. The keyboard assembly includes a keyboard matrix and a keyscan controller coupled to the keyscan matrix. The keyscan controller receives position information from a pressed key of the keyboard matrix and generates basic keyscan information. The embedded controller receives the basic keyscan information and generates keycodes based upon the basic keyscan information.

8 Claims, 2 Drawing Sheets

UNIVERSAL KEYBOARD CONTROLLER DATA PROTOCOL

BACKGROUND OF THE INVENTION

1. Field of the Invention

The present invention relates in general to the field of user inputs to an information handling system, and more particularly to a universal keyboard controller data protocol.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically allow user inputs through a number of different types of devices. Known input devices include a keyboard or mouse that communicates user inputs as electrical signals through a wired or wireless connection to a port of the information handling system. For example, with a keyboard, a keyscan matrix identifies the position of a keystroke by a user based on an electrical signal communicated through a USB interface. Typically, a microcontroller in a keyboard of the information handling system converts the keystroke into a Human Interface Device (HID) packet that is made available for use by components of the information handling system. Portable information handling systems typically have integrated keyboards and integrated pointing devices, such as touchpad pointing devices that are physically built into the housing of the information handling system along with the processing components.

One challenge with integration of a keyboard and pointing device into a portable information handling system is that a first set of wires is used to communicate signals from the keyboard to the motherboard of the information handling system and a separate set of wires is used for the pointing device. These separate sets of wires can be bulky Known integrated keyboards send an actual keyscan for the key being pressed. With integrated keyboards, the keyboard scan matrix may be moved from the main embedded controller of the information handling system to a generic dedicated keyboard scan controller. A change in the keyboard matrix would then necessitate a change in the firmware loaded into the dedicated keyboard scan controller. This change could increase the cost of the dedicated keyboard scan controller by requiring an updateable part, such as a flash memory, storage for a downloadable matrix or different silicon for each keyboard matrix that is produced.

SUMMARY OF THE INVENTION

In accordance with the present invention, a keyboard system in which basic keyscan information is provided from a dedicated keyscan controller to an embedded controller of an information handling system is set forth. The basic keyscan information provides a universal keyboard controller protocol. The universal keyboard controller protocol includes row and column information for the pressed key, whether the keyscan information is a make (i.e., when a key is pressed) or break (i.e., when a key is released) of a particular row or column, and if the pressed key is a repeat of a make of the row and column. The embedded controller then maps the row and column information to the particular platform and keyboard that is installed to generate the correct key pressed information. A single dedicated keyscan controller can thus be used for any platform without adding upgradeability cost burden to the dedicated keyscan controller. Such a system allows for dedicated functions to be added to an integrated keyboard without generating new key codes. These key functions could include a function (Fn) key, dedicated multimedia control buttons, alternate keys and dedicated number pad.

More specifically, in one embodiment, the invention relates to a keyboard system which includes a keyboard assembly and an embedded controller. The keyboard assembly includes a keyboard matrix and a keyscan controller coupled to the keyscan matrix. The keyscan controller receives position information from a pressed key of the keyboard matrix and generates basic keyscan information. The embedded controller receives the basic keyscan information and generates keycodes based upon the basic keyscan information.

In another embodiment, the invention relates to an information handing system which includes a processor, memory coupled to the processor, a keyboard assembly and an embedded controller. The keyboard assembly includes a keyboard matrix and a keyscan controller coupled to the keyscan matrix. The keyscan controller receives position information from a pressed key of the keyboard matrix and generates basic keyscan information. The embedded controller receives the basic keyscan information and generates keycodes based upon the basic keyscan information.

BRIEF DESCRIPTION OF THE DRAWINGS

The present invention may be better understood, and its numerous objects, features and advantages made apparent to those skilled in the art by referencing the accompanying drawing.

DETAILED DESCRIPTION

Figure 1:
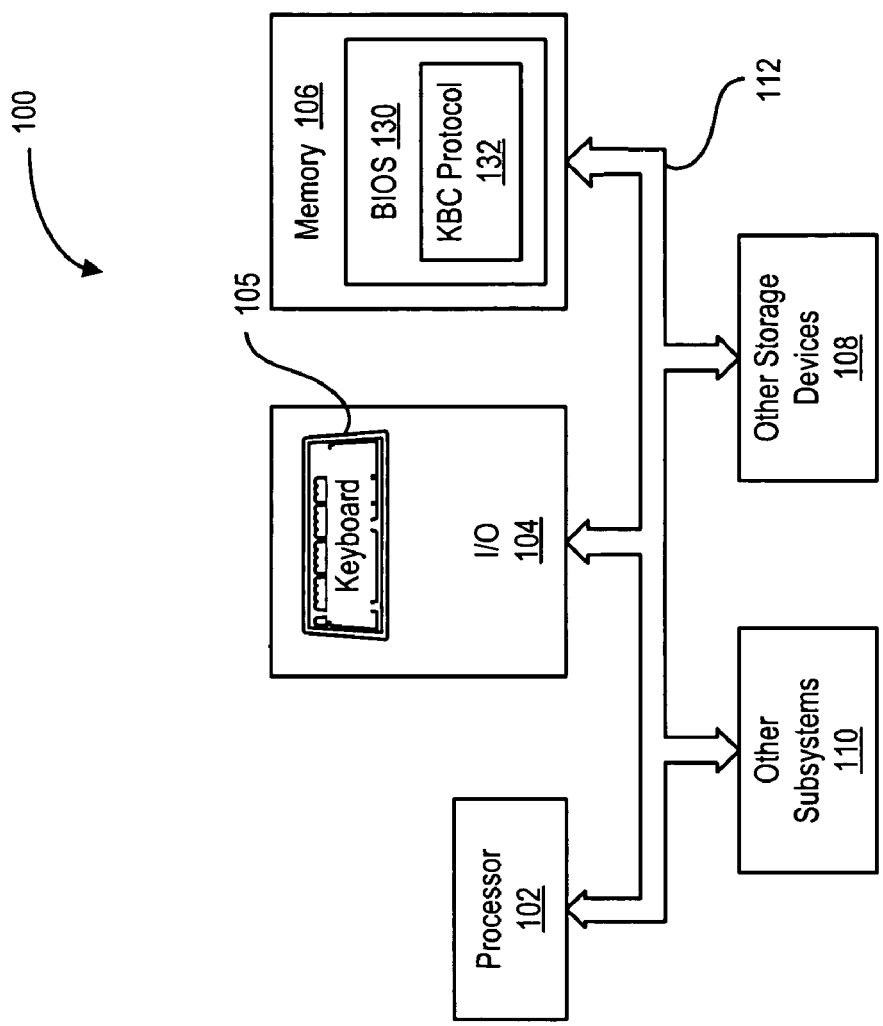
FIG. 1 shows a block diagram of an information handling system.

Referring to FIG. 1, a system block diagram of an information handling system 100 is shown. The information handling system 100 includes a processor 102, input/output (I/O) devices 104, such as a display, a keyboard 105, a mouse, and associated controllers, memory 106 including volatile memory such as random access memory (RAM) and non-volatile memory such as a hard disk and drive, and other storage devices 108, such as a floppy disk drive, a CD ROM drive and other memory devices, and various other subsystems 110, all interconnected via one or more buses 112. The memory 106 also includes a basic input output system (BIOS) 130 on which a keyboard controller protocol information 132 is stored.

For purposes of this invention, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
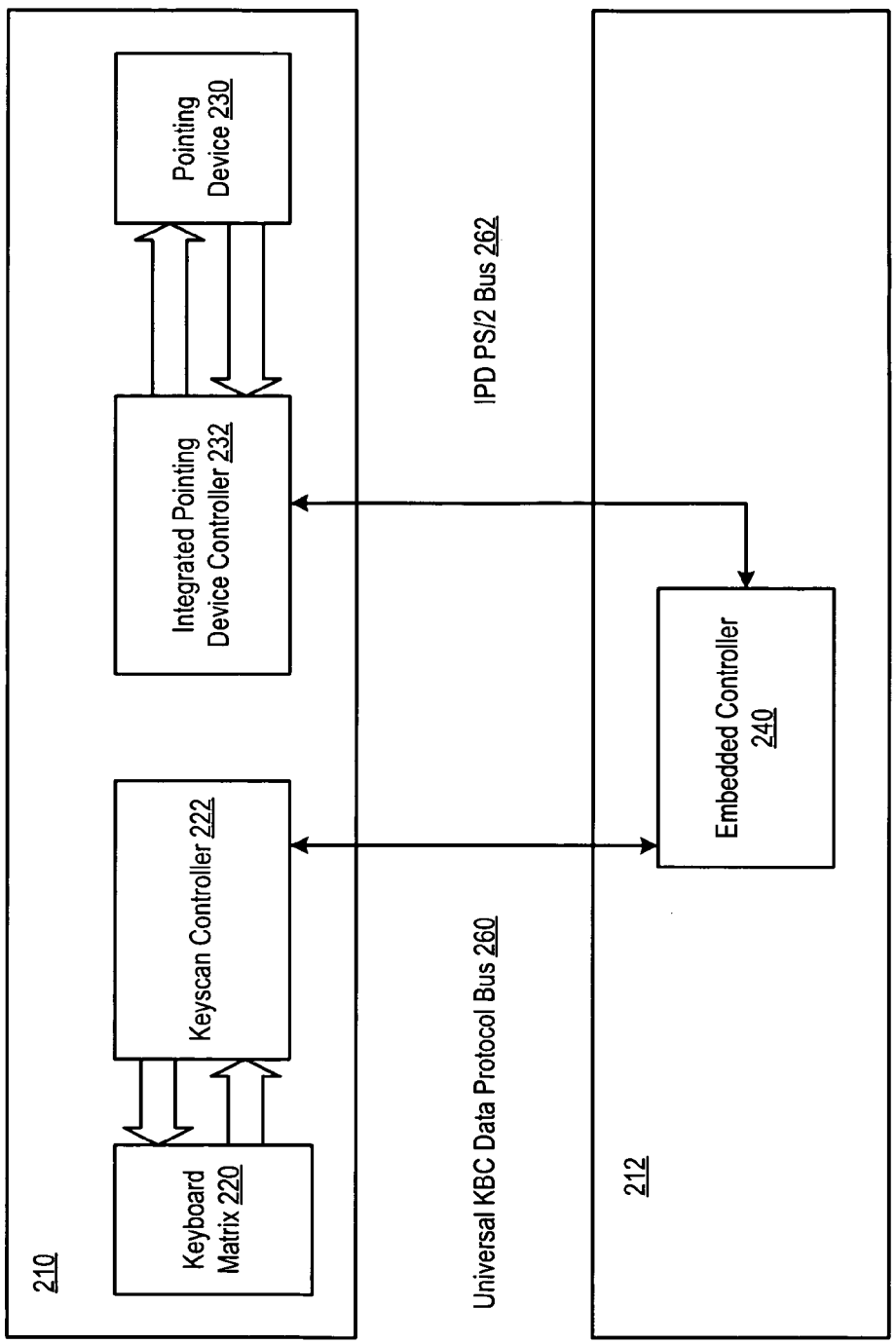
FIG. 2 shows a block diagram of a keyboard system which uses a universal keyboard controller data protocol.

Referring to FIG. 2, a block diagram of a keyboard system 200 which uses a universal keyboard controller (KBC) data protocol is shown. More specifically, the keyboard system 200 includes a keyboard assembly 210 which interacts with the motherboard 212 of the information handling system 100. The keyboard assembly includes a keyboard matrix 220 and a keyscan controller 222 coupled to the keyboard matrix 220. The keyboard assembly may also include an integrated point device 230 coupled to an integrated pointing device controller 232 The motherboard 212 includes an embedded controller 240 such as an I/O controller. The motherboard 212 typically includes the processor 102 and the memory 106 of the information handling system 100.

Within the keyboard system 200, basic keyscan information is provided from the dedicated keyscan controller 222 to the embedded controller 240. The basic keyscan information provides a universal keyboard controller protocol 260. The universal keyboard controller protocol includes row and column information for the pressed key, whether the keyscan information is a make (i.e., when a key is pressed) or break (i.e., when a key is released) of a particular row and column, and if the pressed key is a repeat of a make of the row and column. The embedded controller 240 then maps the row and column information to the particular platform and keyboard that is installed in the information handling system 100 to generate the correct keycode information. A single dedicated keyscan controller 222 can thus be used for any platform without adding upgradeability cost burden to the dedicated keyscan controller. Such a system allows for dedicated functions to be added to an integrated keyboard without generating new key codes. These key functions include for example a function (Fn) key as well as dedicated multimedia control buttons.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A keyboard system comprising:
   a keyboard assembly, the keyboard assembly including a keyboard matrix and a keyscan controller coupled to the keyscan matrix, the keyscan controller receiving position information from a pressed key of the keyboard matrix and generating basic keyscan information, the basic keyscan information corresponding to a universal keyboard controller protocol; and
   an embedded controller coupled to the keyscan controller of any one of a plurality of unique keyboard assemblies, each of the plurality of keyboard assemblies comprising a particular keyboard matrix, the embedded controller receiving the basic keyscan information and generating keycodes based upon the basic keyscan information, the keycodes corresponding to a the particular integrated keyboard matrix so as to enable the keyscan controller to be used on any of a the plurality of integrated keyboards keyboard assemblies.

2. The keyboard system of claim 1 wherein:
   the universal keyboard controller protocol includes row and column information corresponding to the position information received from the keyboard matrix.

3. The keyboard system of claim 1 wherein:
   the universal keyboard controller protocol includes make or break information corresponding to the position information received from the keyboard matrix.

4. The keyboard system of claim 1 wherein:
   the universal keyboard controller protocol includes repeat information corresponding to the position information received from the keyboard matrix indicating whether the pressed key is a repeat of a make.

5. An information handling system comprising:
   a processor;
   a memory coupled to the processor;
   a keyboard assembly, the keyboard assembly including a keyboard matrix and a keyscan controller coupled to the keyscan matrix, the keyscan controller receiving position information from a pressed key of the keyboard matrix and generating basic keyscan information, the basic keyscan information corresponding to a universal keybaord controller protocol; and an embedded controller coupled to the keyscan controller of any one of a plurality of unique keyboard assemblies, each of the plurality of keyboard assemblies comprising a particular keyboard matrix, the embedded controller receiving the basic keyscan information and generating keycodes based upon the basic keyscan information, the keycodes corresponding to a the particular integrated keyboard matrix so as to enable the keyscan controller to be used on any of a the plurality of integrated keyboards keyboard assemblies.

6. The information handling system of claim 5 wherein:
the universal keyboard controller protocol includes row and column information corresponding to the position information received from the keyboard matrix.

7. The information handling system of claim 5 wherein:
the universal keyboard controller protocol includes make or break information corresponding to the position information received from the keyboard matrix.

8. The information handling system of claim 5 wherein:
the universal keyboard controller protocol includes repeat information corresponding to the position information received from the keyboard matrix indicating whether the pressed key is a repeat of a make.

* * * * *